(12) United States Patent
Toribio et al.

(10) Patent No.: US 8,941,937 B1
(45) Date of Patent: Jan. 27, 2015

(54) ADDRESSING INSUFFICIENT BIT ERROR RATES AMONGST SEGMENTS

(71) Applicant: Seagate Technology LLC, Cupertino, CA (US)

(72) Inventors: Jose Mari Corral Toribio, Singapore (SG); Lim Teck Khoon, Singapore (SG); Lau Luh Chyuan, Singapore (SG); Clifford Jayson Bringas Camalig, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/336,390

(22) Filed: Jul. 21, 2014

(51) Int. Cl.
*G11B 27/36* (2006.01)

(52) U.S. Cl.
USPC .......................................................... 360/31

(58) Field of Classification Search
USPC ............ 360/31, 53, 77.01, 75, 48, 39, 64, 40, 360/55, 51
See application file for complete search history.

(56) References Cited

U.S. PATENT DOCUMENTS

| | | | |
|---|---|---|---|
| 6,956,710 B2* | 10/2005 | Yun et al. | 360/53 |
| 7,012,771 B1 | 3/2006 | Asgari et al. | |
| 7,362,529 B2 | 4/2008 | Chiao et al. | |
| 8,031,423 B1 | 10/2011 | Tsai et al. | |
| 8,085,487 B1 | 12/2011 | Jung et al. | |
| 8,732,555 B2 | 5/2014 | Camalig et al. | |

* cited by examiner

*Primary Examiner* — Nabil Hindi
(74) *Attorney, Agent, or Firm* — Taylor English Duma LLP (57) ABSTRACT

Technologies are described herein for determining the linear storage density of data tracks on a recording media of a storage device while compensating for segments of the recording media with poor bit-error rates. The sectors of the data track are grouped into a plurality of segments and a bits-per-inch capability ("BPIC") value is determined for each of the plurality of segments based on a target bit-error rate. The lowest segment BPIC value from amongst the plurality of segments is then determined as well as an average BPIC value for the entire data track. The final BPI value for the data track is determined based on the average BPIC value and the lowest segment BPIC value.

20 Claims, 7 Drawing Sheets

ADDRESSING INSUFFICIENT BIT ERROR RATES AMONGST SEGMENTS

BRIEF SUMMARY

The present disclosure relates to technologies for determining the linear storage density of data tracks on a recording media of a storage device, such as a hard-disk drive ("HDD") device, while compensating for segments of the recording media with poor bit-error rates. According to some embodiments, a method for determining a linear storage density for a data track on a recording medium comprises grouping sectors of the data track into a plurality of segments and then determining a bits-per-inch capability ("BPIC") value for each of the plurality of segments based on a target bit-error rate. The lowest segment BPIC value from amongst the plurality of segments is then determined as well as an average BPIC value for the entire data track. The final BPI value for the data track is determined based on the average BPIC value and the lowest segment BPIC value.

According to further embodiments, a computer-readable medium has processor-executable instructions stored thereon that cause a processor to group sectors of a data track on a recording medium into a plurality of segments. The average bit-error rate ("BER") is determined for each of the plurality of segments based on the BER of the sectors grouped into the segment and a bits-per-inch capability ("BPIC") value is determined for the segment having a poorest average BER. A BPIC value is determined for the entire data track and a BPI adjustment needed to address the segment having the poorest average BER is calculated by subtracting the BPIC value for the segment having the poorest average BER from the BPIC value for the entire data track.

According to further embodiments, a system comprises a hard disk drive having a recording medium, a processor operably connected to the hard disk drive, and a VBAR tuning module operably connected to the hard disk drive and the processor and configured to group sectors of a data track on the recording medium into a plurality of segments. The VBAR tuning module determines an average bit-error rate ("BER") for each of the plurality of segments is determined based on the BER of the sectors grouped into the segment. Then a bits-per-inch capability ("BPIC") value for the segment having a poorest average BER is determined. The VBAR tuning module then determines a BPIC value for the entire data track and calculates a BPI adjustment needed to address the segment having the poorest average BER by subtracting the BPIC value for the segment having the poorest average BER from the BPIC value for the entire data track. A final BPI value for the data track is determined based on the BPI adjustment.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for determining the linear storage density of data tracks on the recording media of a storage device while compensating for segments of the recording media with poor bit-error rates. A typical storage device may include a hard-disk drive ("HDD") device. The HDD device may contain a number of disks having a magnetic recording surface upon which data is stored. The recording surface(s) may be formatted to include a number of concentric data tracks, the data tracks further divided into sectors that contain the data stored on the device.

Surface roughness, uneven coercivity, irregular flatness, and other anomalies in the magnetic recording surface can adversely affect the read/write performance of the HDD. These media anomalies may cause some areas of the recording media to exhibit unacceptable bit-error rates ("BER") during readback of recorded data. Problems associated with the read/write heads that read and write data to the recording media may also cause insufficient BER rates in some areas of the recording media, as will be described below.

The areal density of the recording surface(s) in the HDD may be tuned during formatting and testing of the drive, also referred to herein as certification processing or "CERT," to ensure the drive meets its target storage capacity while having a minimal number of areas with insufficient BER. Areal density parameters may include the linear recording density of the data tracks, measured in bits-per-inch ("BPI"), as well as other parameters, such as the number of tracks per inch ("TPI") configured on the recording surface(s). The BPI value for a sector, track, zone, or other area of the recording surface at which minimum acceptable BER level may be achieved is referred to as the bit-per-inch capability ("BPIC") of the area. For example, the minimum acceptable functional BER may be −2.3 db.

In a conventional areal density tuning process, the determination of the BPIC of data tracks in a zone or other area of the recording surface may be based on the average BER of all sectors in one or more test tracks. The total bits-in-error of all sectors in the test track may be determined from a read of the test track written at a configured BPI value, and the total bits-in-error value is then divided by the total bits read to determine an average BER. The test track is written and read at different BPI values until the minimum acceptable BER level is achieved. The determined BPIC value of the test track(s) within the zone may then be used in capacity targeting to determine the final bits-per-inch picked ("BPIP") for the zone.

This conventional tuning approach works best when the BER variations amongst sectors are small or negligible. However, when a particular area of the data track has a significantly poorer BER than the average for the entire track, due to the anomalies in the recording surface and/or read/write head problems as described above, sectors in that area may still experience significant read errors due to poorly written signals at the selected BPIP, causing these sectors to fail in subsequent testing and/or contributing to poor performance and reliability of the HDD.

According to embodiments presented herein, a novel approach to areal density tuning includes grouping the sectors of a data track into segments for finer analysis and tuning. The BER of each segment is calculated separately, and the BPI of the track is adjusted until the minimum acceptable BER level is achieved for the poorest segment. This tuning method improves overall reliability and performance of the HDD because those sector segments having significantly poorer BER than the average are addressed in the calculation of the final linear storage density for the track without affecting population data that does not exhibit insufficient bit-error rates.

Figure 1:
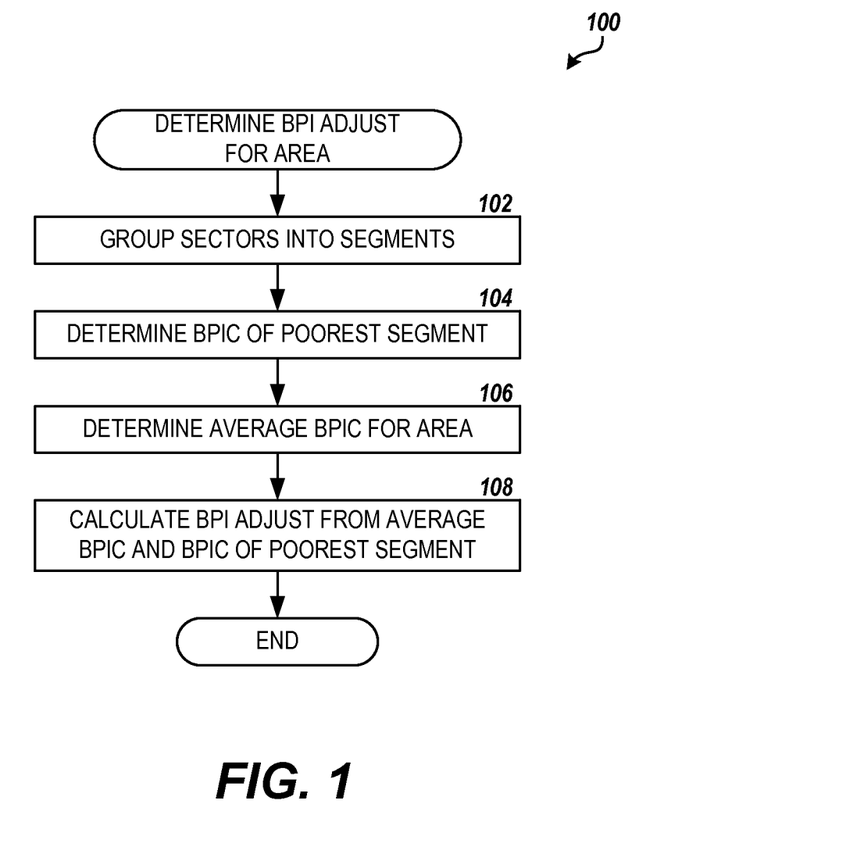
FIG. 1 is a flow diagram showing one method for determining a BPI adjustment value used to calculate the linear storage density of data tracks on a recording media of a storage device, according to embodiments described herein.

FIG. 1 shows aspects of the improved areal density tuning method according to the embodiments described herein. Specifically, FIG. 1 illustrates one routine 100 for determining a BPI adjustment value, also referred to herein as a BPI margin ("BPIM"), for data tracks in a zone or other area of the recording surface(s) of a storage device. The BPI adjustment value may be subsequently used along with other areal density and capacity parameters to determine the final linear storage density ("BPIP") of the of the data tracks in the area during capacity targeting. According to some embodiments, the routine 100 may be performed by a controller of the storage device during CERT processing of the device. The routine 100 includes step 102, where the sectors of a target track are grouped into segments. The number of sectors in each segment can be fine-tuned based to modify the measurement variation capability among the sectors. The number of sectors in a segment is adjusted accordingly to increase or decrease the sensitivity towards sector to sector variations.

From step 102, the routine 100 proceeds to step 104, where the BPIC value is determined for the segment having the poorest BER performance from amongst the segments. As described above, the BER of each segment may be calculated individually with the BPI adjusted until the BER of the poorest segment reaches the minimum acceptable BER level. In some embodiments, the minimum acceptable BER level may be −2.3 db. Next, at step 106 an average BPIC for the data track is calculated using the conventional calculation method described above. For example, the BER for the entire track is determined and the BPI adjusted until the minimum acceptable BER level is achieved. Finally, at step 108, the BPI adjustment value is calculated from the average BPIC and the BPIC value of the poorest segment. In one embodiment, the BPI adjustment is calculated using the following formula:

$$BPIM_{zone} = BPIC_{average} - BPIC_{poorest\ segment}$$

From step 108, the routine 100 ends.

Figure 2:
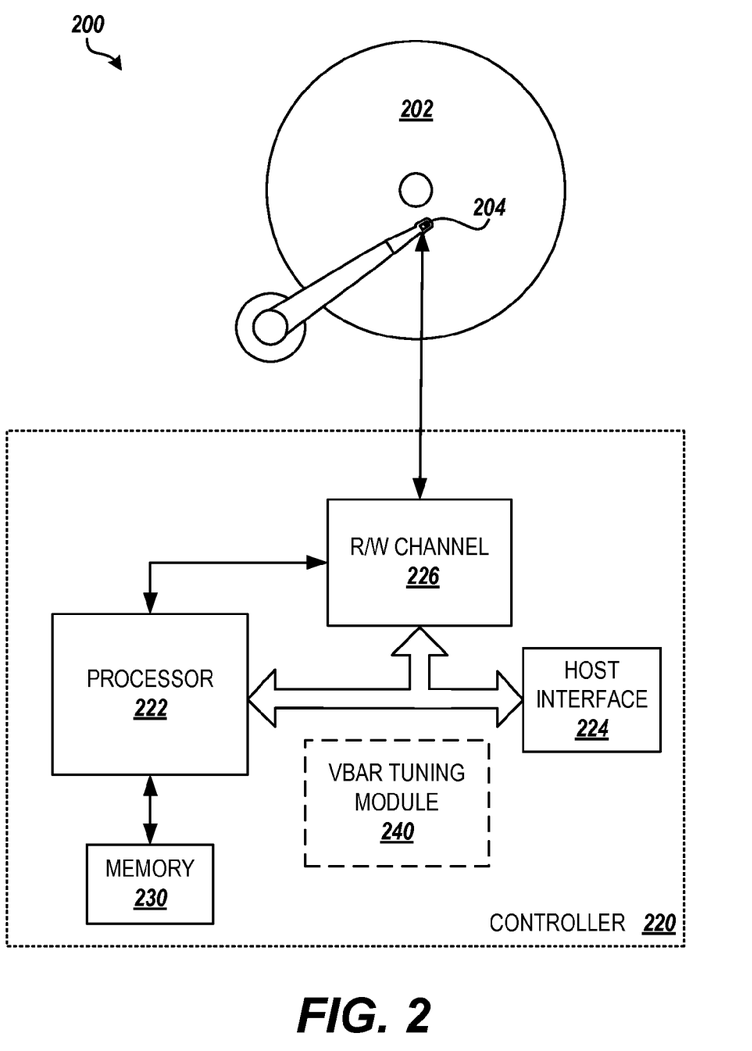
FIG. 2 is a block diagram showing an illustrative environment for determining the linear storage density of data tracks on a recording media of a storage device while compensating for segments of the recording media with poor bit-error rates, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for determining the linear storage density of data tracks on the recording media of the storage device, according to the embodiments provided herein. The storage device 200 may include recording media comprising at least one platter or disk 202.

The storage device 200 further includes at least one read/write head 204 located adjacent to the surface of each disk 202. The read/write head 204 may read information from the disk 202 by sensing a magnetic field formed on portions of the magnetic recording surface of the disk, and may write information to the disk by magnetizing a portion of the surface of the disk. It will be appreciated by one of ordinary skill in the art that the read/write head 204 may comprise multiple components, such as a magneto-resistive ("MR") or tunneling MR reader element, a writer element, an air bearing and the like.

Figure 3:
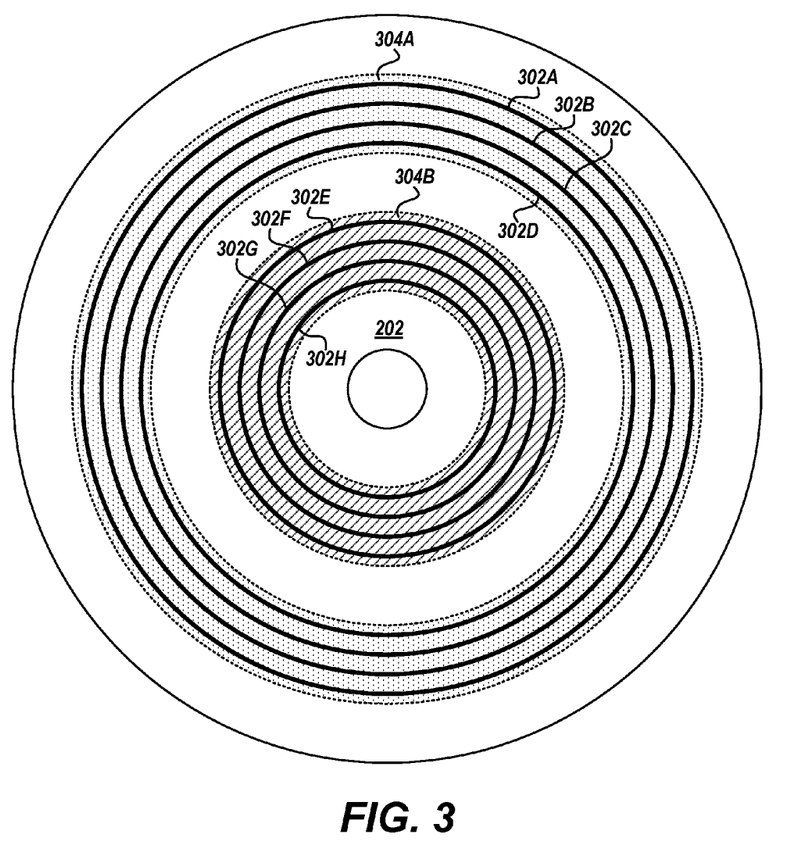
FIG. 3 is a block diagram showing an illustrative layout of data tracks on disk media, according to embodiments described herein.

According to some embodiments, the recording surface of the disk 202 is divided or "formatted" into a number of individual data tracks, such as data tracks 302A-302H (referred to herein generally as data tracks 302) shown in FIG. 3. The data tracks 302 may represent substantially concentric circular areas on the surface of the disk 202. The data tracks 302 may be interspersed at a configured track pitch, resulting in a particular track density, measured in tracks-per-inch ("TPI"). The track pitch or track density may be configured during initial formatting and testing, or CERT processing, of the storage device 200, according to some embodiments. The data tracks 302 may further be grouped into zones, such as zones 304A and 304B (referred to herein generally as zones 304), based on their position on the disk 202, e.g., near the inner diameter ("ID") or outer diameter ("OD") of the disk.

Figure 4:
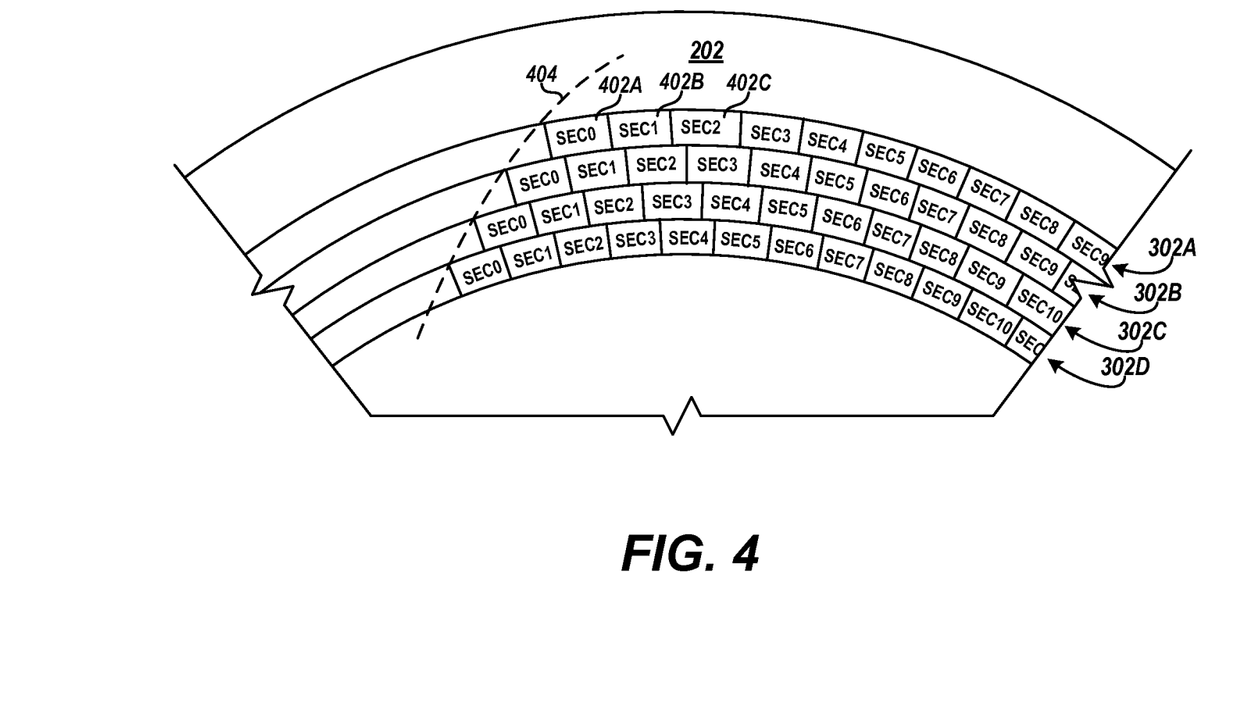
FIG. 4 is a block diagram showing an illustrative layout of sectors in data tracks on the disk media, according to embodiments described herein.

As shown in FIG. 4, each data track 302A-302D is further be divided or formatted into a number N of data sectors, such as sectors 402A-402C (referred to herein generally as sectors 402). The sectors 402 may represent independent areas of the data track 302 in which user data is stored and maybe numbered sequentially in the data track 302 from sector 0 to sector N. The number of sectors 402 per data track 302 may vary from zone to zone, as may the linear recording density of the tracks within a zone, measured in bits-per-inch ("BPI"). The number of sectors 402 and/or the BPI of each data track 302 may be configured during CERT processing, according to some embodiments. It will be appreciated that sector 0 402A of two adjacent data tracks, such as data track 302A and data track 302B, within a zone 304 may not be aligned but instead may be offset by a specific distance, as indicated at 404, to allow time for the read/write head 204 to move from a previous data track 302B to a next data track 302A when seeking from the last sector of the previous track to the first sector of the next. This offset distance is referred to as the cylinder skew 404.

Returning to FIG. 2, the storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the surface of the disk 202. The processor 222 may further process read commands from the host device by determining the location of the desired data on the surface of the disk 202, moving the read/write head(s) 204 over the determined location, reading the data from the surface of the disk via the read/write channel 226, correcting any errors and formatting the data for transfer to the host device.

The read/write channel 226 may convert data between the digital signals processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned to read or write data to a specific sector 402 on the on the surface of the disk 202 by moving the read/write head 204 radially across the data tracks 302 using the actuator while a motor rotates the disk to bring the target sector under the read/write head.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the non-volatile memory and/or the RAM may store a firmware that comprises commands and data necessary for performing the operations of the storage device 200. According to some embodiments, the memory 230 may store processor-executable instructions that, when executed by the processor 222, perform the routines 100 and 700 for determining the linear storage density of data tracks 302 on the disk 202, as described herein.

In addition to the memory 230, the environment may include other computer-readable media storing program modules, data structures, and other data described herein for determining the linear storage density of data tracks on a recording media of the storage device 200. It will be appreciated by those skilled in the art that computer-readable media can be any available media that may be accessed by the controller 220 or other computing system for the non-transitory storage of information. Computer-readable media includes volatile and non-volatile, removable and non-removable storage media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a variable bit aspect ratio ("VBAR") tuning module 240. The VBAR tuning module 240 may be executed during CERT processing of the storage device 200 to determine the areal density parameters of the recording surface(s) in order to ensure the disk meets the target capacity while ensuring best read/write performance and reliability of the drive. According to embodiments, the VBAR tuning module 240 may perform the methods and processes described herein for determining the linear recording density of data tracks 302 in the storage device 200. According to some embodiments, the VBAR tuning module 240 may be implemented in the controller 220 as software, hardware, or any combination of the two. For example, the VBAR tuning module 240 may be stored in the memory 230 as part of the firmware of the storage device 200 and may be executed by the processor 222 for performing the methods and processes described herein. The VBAR tuning module 240 may alternatively or additionally be stored in other computer-readable media accessible by the controller 220. In further embodiments, the VBAR tuning module 240 may be implemented in a computing system external to and operably connected to the storage device 200, such as in a driver module of a host device connected to storage device through the interface 224, for example. The VBAR tuning module 240 may further be stored in a memory or other computer-readable media accessible by the computing system and be executed by a processor of the computing system.

It will be appreciated that the structure and/or functionality of the storage device 200 may be different that that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 5:
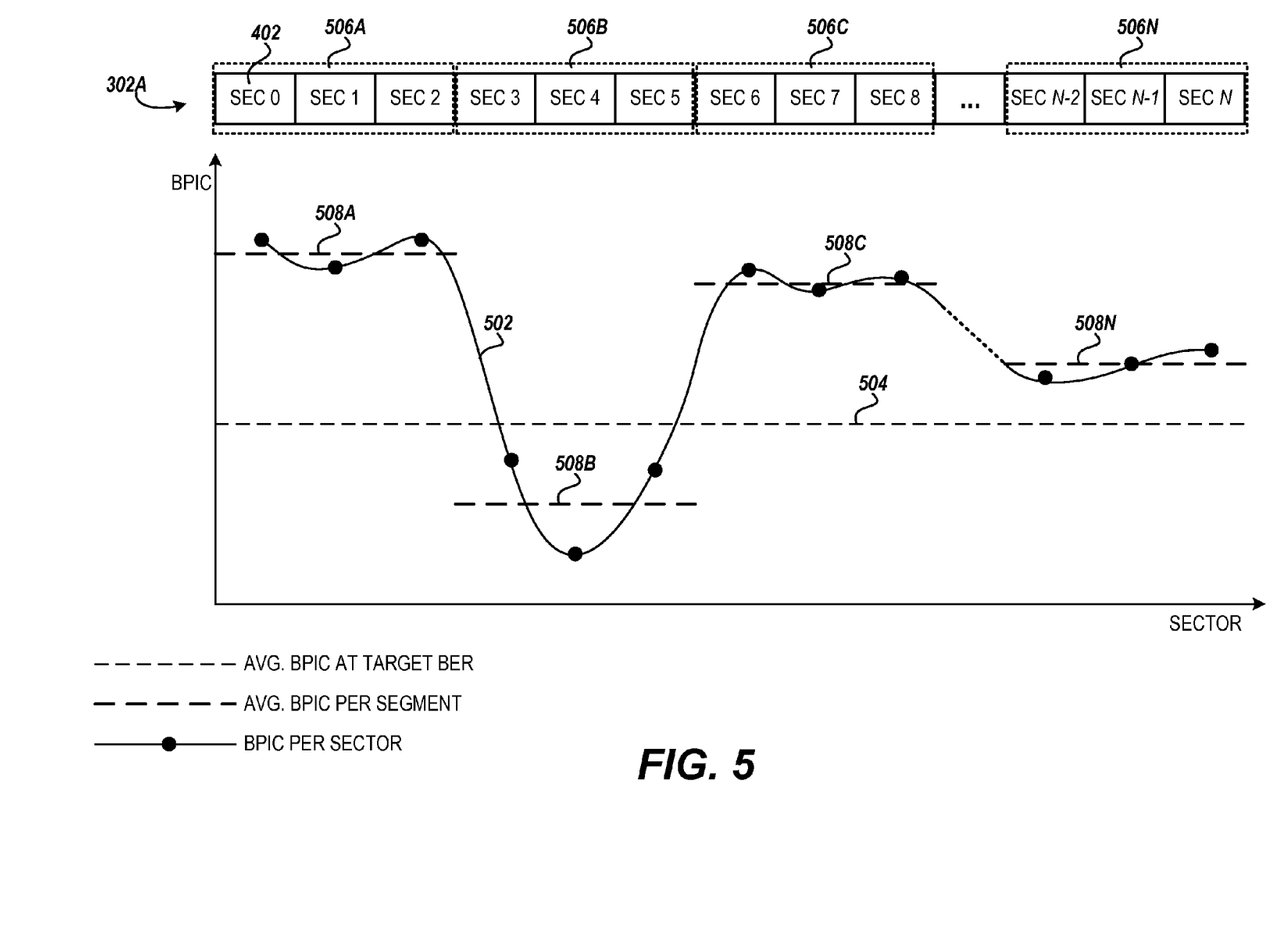
FIG. 5 is a diagram showing additional details of the division of sectors into segments and calculation of BPIC values by segment, according to some embodiments.

FIG. 5 provides additional details of the methods described herein for measuring BPIC by segment and determining the linear storage density of data tracks 302. Line 502 shows the actual BPIC at the target BER of each sector 402 for an exemplary target data track 302A. Line 504 shows average BPIC of the track determined by the conventional BER measurement method described above. For example, the BER for the entire data track 302 may be determined and the BPI adjusted until the minimum acceptable BER level is achieved. As may be seen in the figure, the actual BPIC of several sectors 402 (SEC 3-SEC 5) falls well below the average BPIC 504 for the track 302A. If the conventional method is utilized to determine the linear storage density (BPIP) for the data track 302A, then these sectors may fail CERT testing or exhibit excessive read failures during normal operation (referred to herein as "user mode") of the storage device 200.

According to the embodiments described herein, one or more target data tracks, such as data track 302A, is subdivided into groups of sectors or "segments," such as segments 506A-506N (referred to herein generally as segments 506), for finer analysis and tuning. The total number of sectors 402 in a segment 506 can be modified based on the measurement variation capability of the testing method. The number of sectors 402 in one segment 506 may be adjusted accordingly to increase or decrease the sensitivity towards sector to sector variations. The average BPIC for each segment is determined separately. In some embodiments, the BER of each sector 402 within the segment 506 and the BPIC of the segment determined based on the average BER of the sectors. The average BPIC for each of the exemplary segments 506A-506N is shown in FIG. 5 at 508A-508N, respectively. As may be seen in the figure, the average BPIC 508B for the segment 506B containing the poorly performing sectors SEC 3-SEC 5 is substantially less than the average BPIC 504 for the data track 302A. According to embodiments, a BPI adjustment value (BPIM) is calculated by subtracting the average BPIC 508B from the poorest segment 506B from the average BPIC 504 for the target data track 302A. The BPIM may then be utilized during capacity targeting to calculate the BPIP for the data track 302A.

Figure 6A:
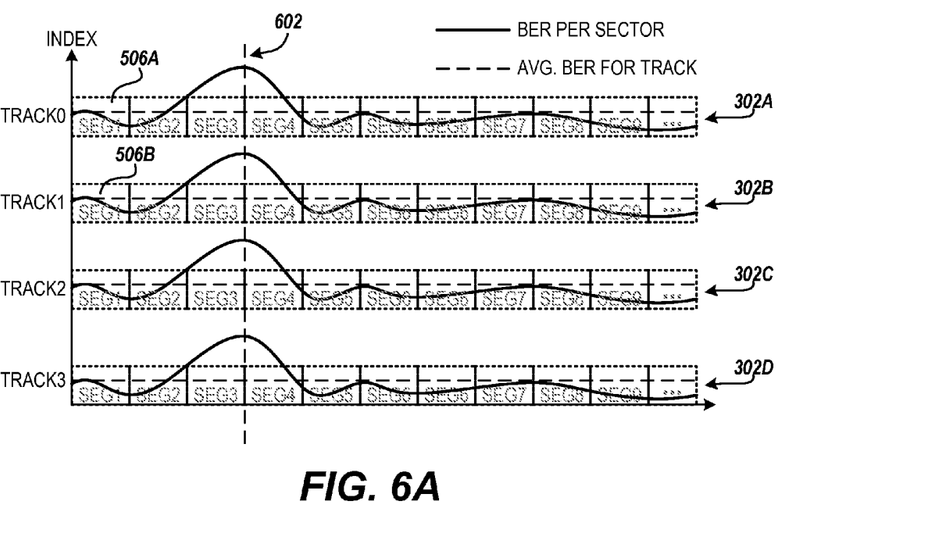
FIGS. 6A and 6B are block diagrams showing different schemes of grouping sectors into segments based on different types of problems that may cause sectors to have insufficient bit-error rates.
Figure 6B:
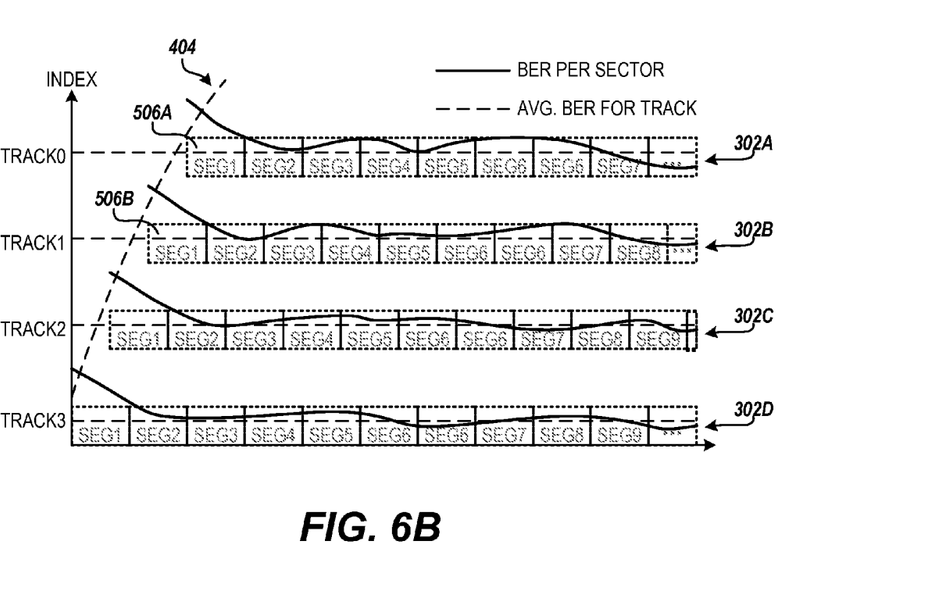

FIGS. 6A and 6B provide details regarding different schemes of grouping sectors into segments based on different types of problems that may cause sectors to have insufficient bit-error rates. As described above, some sectors 402 in a particular track, such as data track 302A, exhibit poor BER performance because of roughness, uneven coercivity, irregular flatness, and other anomalies in the magnetic recording surface(s) of the disks 202. The neighboring sectors 402 on adjacent tracks, such as data track 302B, that also exhibit poor BER performance due to these anomalies align with the sector on the particular data track 302A based on a common distance from an index on the disk surface, as shown at 602 in FIG. 6A. These problems due to problematic media are referred to herein as once-around ("OAR") problems. In the case of OAR problems, the sectors 402 of each data track 302 may be grouped into segments 506 based on the sectors distance from the index, as shown in FIG. 6A. It will be appreciated that in this case aligned segments 506A and 506B on adjacent tracks may not contain the same numbered sectors 402 due to the cylinder skew 404 used in the sector layout.

As further discussed above, problems associated with a read/write head 204 of the storage device 200 may also cause insufficient BER rates in some sectors 402. These problems are generally associated with slow heater protrusion and/or gradual rise time in writing power of the head. The head may start to write the first sector (SEC 0) of a data track 302 before it reaches the required head temperature and media spacing, resulting in a weak write signal and poor BER in readback among the first couple of sectors 402 on each track. These problems due to a problematic head are referred to herein as first-sector write ("FSW") problems. In the case of FSW problems, the sectors 402 of the data tracks 302 are grouped into segments 506 based on the sector number, as shown in FIG. 6B. It will be appreciated that in this case that similarly numbered segments 506A and 506B on adjacent tracks will contain the same numbered sectors and will align based on the cylinder skew 404 used in the sector layout.

The measurement procedures or routines described herein may be performed on multiple test tracks within a zone 304 or other area of the recording surface using different schemes of grouping the sectors 402 into segments 506 in order to classify the type of problems causing insufficient BER. Classifying the problems as media-related problem or head-related problem enables the processes to apply separate compensation depending on the severity of the problem(s). This type of classification may also help engineering teams address the fundamental root cause of the issues. It will be appreciated that other segmenting schemes may be conceived allowing for the classification of other types of problems, and it is intended that all such segmenting schemes be included in this application.

Figure 7:
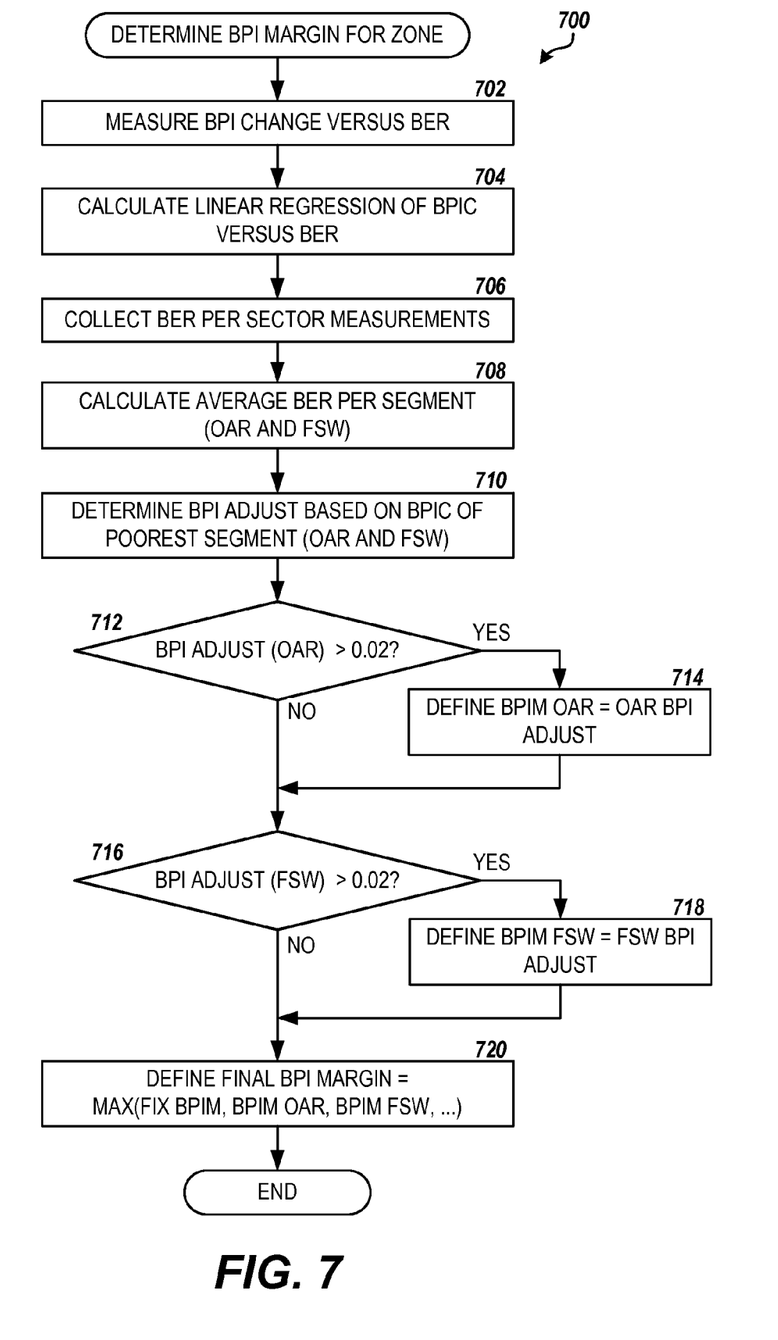
FIG. 7 is a flow diagram showing another routine for method for determining a BPI adjustment value used to calculate the linear storage density of data tracks on a recording media of a storage device, according to embodiments described herein.

FIG. 7 illustrates one routine 700 for determining the BPI adjustment value (BPIM) for the data tracks 302 in a zone 304 or other area of the recording surface(s) of a storage device 200 while compensating for different types of BER performance issues (e.g., OAR or FSW). The BPI adjustment value may be subsequently used along with other areal density and capacity parameters to determine the final linear storage density ("BPIP") of the of the data tracks 302 in the zone 304 during capacity targeting. According to some embodiments, the routine 700 may be performed by the VBAR tuning module 240 during CERT processing of the storage device 200. In further embodiments, the routine 700 may be performed by the controller 220 of the storage device 200, by external processors or computing systems accessing data from the device or some other combination of modules, processors and devices.

The routine 700 begins at step 702, where the VBAR tuning module 240 measures change in BER for various BPI levels on the recording surface. In some embodiments, this measurement may be performed separately for each read/write head 204 and corresponding recording surface in the storage device 200. In other embodiments, this measurement may be performed by read/write head 204 and zone 304, or by some other combination of the areas of the recording surface(s) within the storage device 200. By measuring the change in sector, segment, or track BER while adjusting the BPI, the VBAR tuning module may then calculate a linear regression relating BPIC to BER for the read/write head 204, as shown at step 704. For example, the calculated linear regression may result in the equation:

$$BPIC = m(BER) + b$$

where BPIC is the BPI value at which the minimum acceptable BER level may be achieved, BER is the measured bit-error rate from the area, and separate values for m and b are determined for each read/write head location.

Next, the routine 700 proceeds from step 704 to step 706, where the VBAR tuning module 240 collects BER measurements for each of the sectors 402 of the data track(s) 302. As described above, BER measurements may be performed on a number of test data tracks 302 within the zone 304. For example, the BER measurements may be performed on 5 data tracks 302 of 30 sectors each spread equally throughout the zone 304. In this case, 150 BER measurements may be collected in the zone (5 tracks×30 sectors per track).

From step 706, the routine 700 proceeds to step 708, where the VBAR tuning module 240 calculates an average BER per segment 506 within the zone 304. In some embodiments, the average BER for a segment 506 may be calculated by averaging the BER measurements collected in step 706 for each sector 402 on each data track 302 grouped into the segment. According to further embodiments, the average BER for each segment 506 may be calculated for different segmenting schemes. For example, the sectors 402 of the data tracks 302 may be grouped into segments 506 according to their respective distance from the index during the BER measurements for calculating average BER for each segment in order to identify media-related (OAR) problems, as shown in FIG. 6A. The sectors 402 of the data tracks 302 may then be grouped into segments 506 according to their respective sector numbers in order to calculate the average BER for each segment in order to identify head-related (FSW) problems, as shown in FIG. 6B.

Next, at step 710, the VBAR tuning module calculates the BPI adjustment value for the zone 304 based on the BPIC of the segment 506 having the poorest average BER. According to some embodiments, the segment 506 with the poorest average BER is determined and the linear regression calculated at step 704 may then be utilized to calculate the BPIC of the segment with the poorest BER. Alternatively, an iterative method can be used to determine the BPIC of the poorest segment 506 wherein the BER of the segment is measured while writing test data to the segment at varying BPI until the minimally acceptable BER is reached.

As described above, the BPI adjustment value is calculated from the difference between the conventional BPIC of the data tracks 302 and the BPIC of the poorest segment 506. In some embodiments, the BPIC of the segment 506 having the poorest BER is determined for each segmenting scheme, and a BPI adjustment value is calculated separately using the following equations:

$$\text{BPI Adjust}_{OAR} = \text{BPIC}_{average} - \text{BPIC}_{poorest\ segment(OAR)}$$

$$\text{BPI Adjust}_{FSW} = \text{BPIC}_{average} - \text{BPIC}_{poorest\ segment(FSW)}$$

where $\text{BPIC}_{average}$ is the conventional BPIC required to achieve the target bit-error rate (the minimum acceptable BER level).

According to further embodiments, a minimum compensation threshold is defined for each segmenting scheme to cater to normal and acceptable measurement variations. The final BPIM value is only defined and enabled if the calculated BPI adjustment value is higher than the defined minimum compensation threshold, such as 2%. Accordingly, as shown at 712 in FIG. 7, if the BPI adjustment value calculated for media-related problems exceeds the compensation threshold value, the $\text{BPIM}_{OAR}$ is defined to be the BPI adjustment value computed for the media-related problems, as shown at 714. Similarly, as shown at 716, if the BPI adjustment value calculated for head-related problems exceeds the compensation threshold value, the $\text{BPIM}_{FSW}$ is defined to be the BPI adjustment value computed for head-related problems, as shown at 718. The routine 700 then proceeds to step 720, where the final BPIM for the zone is selected from the maximum of the $\text{BPIM}_{OAR}$, the $\text{BPIM}_{FSW}$, and other parameter values, including BPIM values calculated for other segmenting schemes and/or a fixed BPIM set by designers of the storage device 200 based on a probable impact that a later process may have on the BPIP. The final BPIM for the zone may then be utilized to calculate the BPIP for the zone in capacity targeting. From step 720, the routine 700 ends.

Based on the foregoing, it will be appreciated that technologies for determining the linear storage density of data tracks on the recording media of a storage device while compensating for segments of the recording media with poor bit-error rates are presented herein. While embodiments are described herein in regard to an HDD device, it will be appreciated that the embodiments described in this disclosure may be utilized in any storage device containing data stored on a recording medium having a configurable areal recording density, including but not limited to, a magnetic disk drive, a hybrid magnetic and solid state drive, a magnetic tape drive, an optical disk storage device, an optical tape drive and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method for determining a linear storage density for a data track on a recording medium, the method comprising steps of:
   grouping sectors of the data track into a plurality of segments;
   determining a bits-per-inch capability ("BPIC") value for each of the plurality of segments based on a target bit-error rate;
   determining a lowest segment BPIC value from amongst the plurality of segments;
   determining an average BPIC value for the entire data track; and
   determining a final bits-per-inch ("BPI") value for the data track based on the average BPIC value and the lowest segment BPIC value.

2. The method of claim 1, wherein determining the final BPI value for the data track comprises:
   calculating a BPI adjustment needed to address the segment having the lowest BPIC value by subtracting the lowest segment BPIC value from the average BPIC value; and
   determining the final BPI value for the data track based on the BPI adjustment needed to address the segment having the lowest segment BPIC value.

3. The method of claim 2, wherein the final BPI value for the data track is based on the BPI adjustment needed to address the segment having the lowest segment BPIC value if the BPI adjustment is greater than a threshold value.

4. The method of claim 1, further comprising:
   determining a first lowest segment BPIC value associated with a media-related problem, wherein the sectors of the data track are grouped into segments according to the sectors' respective distance from an index on the recording medium; and
   determining a second lowest segment BPIC value associated with a head-related problem, wherein the sectors of the data track are grouped into segments according to the sectors' respective sector numbers,
   wherein the final BPI value for the track is determined based on the average BPIC value, the first lowest segment BPIC value associated with the media-related problem, and the second lowest segment BPIC value associated with the head-related problem.

5. The method of claim 1, wherein determining the lowest segment BPIC value from amongst the plurality of segments comprises:

determine a correlation of bit-error rate ("BER") to BPIC based on a simple linear regression;
determining an average BER for each of the plurality of segments;
determining the segment having a poorest average BER; and
calculating the BPIC value for the segment having the poorest BER based on the correlation.

6. The method of claim 1, wherein a final BPI value is determined for each zone of the recording medium, each zone comprising a plurality of adjacent tracks.

7. The method of claim 1, wherein the method is performed by a controller of a storage device containing the recording medium during a certification processing of the storage device.

8. The method of claim 1, wherein the recording medium is a magnetic surface of a disk in an HDD device.

9. A non-transitory computer-readable medium having processor-executable instructions stored thereon that, when executed by a processor, cause the processor to:
group sectors of a data track on a recording medium into a plurality of segments;
determine an average bit-error rate ("BER") for each of the plurality of segments based on the BER of the sectors grouped into the segment;
determine a bits-per-inch capability ("BPIC") value for the segment having a poorest average BER;
determine a BPIC value for the entire data track; and
calculate a bits-per-inch ("BPI") adjustment needed to address the segment having the poorest average BER by subtracting the BPIC value for the segment having the poorest average BER from the BPIC value for the entire data track.

10. The computer-readable medium of claim 9, wherein a final BPI value for the data track is based on the BPI adjustment needed to address the segment having the poorest average BER if the BPI adjustment is greater than a threshold value.

11. The computer-readable medium of claim 9, having further processor-executable instructions stored thereon that cause the processor to:
group the sectors of the data track into segments according to the respective distance of each sector from an index on the recording medium;
determine a BPIC value of the segment having the poorest average BER associated with a media-related problem;
group the sectors of the data track into segments according to their respective sector numbers; and
determine a BPIC value of the segment having the poorest average BER associated with a head-related problem;
determine a first BPI adjustment by subtracting the BPIC value of the segment having the poorest average BER associated with a media-related problem from the BPIC value for the entire data track; and
determine a second BPI adjustment by subtracting the BPIC value of the segment having the poorest average BER associated with a head-related problem from the BPIC value for the entire data track,
wherein a final BPI value for the data track is based a maximum of the first BPI adjustment and the second BPI adjustment.

12. The computer-readable medium of claim 9, wherein determining the BPIC value for the segment having a poorest average BER comprises:
determine a correlation of BER to BPIC based on a simple linear regression; and
calculating the BPIC value for the segment having the poorest BER based on the correlation.

13. The computer-readable medium of claim 9, wherein a BPI adjustment is determined for each zone of the recording medium, each zone comprising a plurality of adjacent tracks.

14. The computer-readable medium of claim 9, wherein the processor is contained in a controller of a storage device containing the recording medium and the processor-executable instructions are executed by the processor during a certification processing of the storage device.

15. The computer-readable medium of claim 9, wherein the recording medium is a magnetic surface of a disk in an HDD device.

16. A system comprising:
a hard disk drive comprising a recording medium;
a processor operably connected to the hard disk drive; and
a VBAR tuning module operably connected to the hard disk drive and the processor and configured to perform steps of
group sectors of a data track on the recording medium into a plurality of segments,
determine an average bit-error rate ("BER") for each of the plurality of segments based on the BER of the sectors grouped into the segment,
determine a bits-per-inch capability ("BPIC") value for the segment having a poorest average BER,
determine a BPIC value for the entire data track,
calculate a bits-per-inch ("BPI") adjustment needed to address the segment having the poorest average BER by subtracting the BPIC value for the segment having the poorest average BER from the BPIC value for the entire data track, and
determine a final BPI value for the data track based on the BPI adjustment.

17. The system of claim 16, wherein the final BPI value for the data track is based on the BPI adjustment needed to address the segment having the poorest BER if the BPI adjustment is greater than a threshold value.

18. The system of claim 16, wherein the VBAR tuning module is further configured to perform steps of:
group the sectors of the data track into segments according to the respective distance of each sector from an index on the recording medium;
determine a BPIC value of the segment having the poorest average BER associated with a media-related problem;
group the sectors of the data track into segments according to their respective sector numbers; and
determine a BPIC value of the segment having the poorest average BER associated with a head-related problem,
wherein the final BPI value for the data track is determined based on a maximum of a BPI adjustment value calculated from the BPIC value of the segment having the poorest average BER associated with a media-related problem and a BPI adjustment value calculated from the BPIC value of the segment having the poorest average BER associated with a head-related problem.

19. The system of claim 16, wherein determining the BPIC value for the segment having a poorest average BER comprises:
measuring a bit-error rate ("BER") in an area of the data track at each of a plurality of BPI values;
determining a correlation of BER to BPI value based on a simple linear regression; and
calculating the BPIC value for the segment having the poorest BER based on the correlation.

20. The system of claim 16, wherein a final BPI value is determined for each zone of the recording medium, each zone comprising a plurality of adjacent tracks.

\* \* \* \* \*